US010147020B1

(12) United States Patent
Hodson et al.

(10) Patent No.: US 10,147,020 B1
(45) Date of Patent: Dec. 4, 2018

(54) SYSTEM AND METHOD FOR COMPUTATIONAL DISAMBIGUATION AND PREDICTION OF DYNAMIC HIERARCHICAL DATA STRUCTURES

(71) Applicant: Cognism Limited, London (GB)

(72) Inventors: James Hodson, Brighton, MA (US); Johannes Erett, London (GB); Sinan James Isilay, Zurich (CH)

(73) Assignee: Cognism Limited, Finchley, London (GB)

( * ) Notice: Subject to any disclaimer, the term of this patent is extended or adjusted under 35 U.S.C. 154(b) by 0 days.

(21) Appl. No.: 15/696,067

(22) Filed: Sep. 5, 2017

Related U.S. Application Data

(60) Provisional application No. 62/538,508, filed on Jul. 28, 2017.

(51) Int. Cl.
| | |
|---|---|
| *G06F 17/30* | (2006.01) |
| *G06K 9/62* | (2006.01) |
| *G06Q 30/00* | (2012.01) |
| *G06F 15/18* | (2006.01) |
| *G06F 17/18* | (2006.01) |
| *G06Q 10/06* | (2012.01) |
| *G06Q 30/02* | (2012.01) |
| *G06Q 10/04* | (2012.01) |
| *G06Q 10/10* | (2012.01) |

(52) U.S. Cl.
CPC ........... *G06K 9/6221* (2013.01); *G06F 15/18* (2013.01); *G06F 17/18* (2013.01); *G06Q 10/063* (2013.01); *G06Q 30/01* (2013.01); *G06Q 10/04* (2013.01); *G06Q 10/10* (2013.01); *G06Q 30/02* (2013.01)

(58) Field of Classification Search
None
See application file for complete search history.

(56) References Cited

U.S. PATENT DOCUMENTS

| | | | |
|---|---|---|---|
| 8,572,013 B1* | 10/2013 | Nash | G06F 17/30705 706/20 |
| 8,650,177 B2 | 2/2014 | Skomoroch et al. | |
| 8,886,655 B1* | 11/2014 | Nandy | G06F 17/30994 707/749 |
| 9,268,822 B2 | 2/2016 | Wong | |
| 9,904,962 B1* | 2/2018 | Bastide | G06Q 50/01 |
| 2012/0197863 A1 | 8/2012 | Skomoroch et al. | |
| 2012/0226623 A1 | 9/2012 | Jurney et al. | |
| 2013/0110754 A1* | 5/2013 | Ravindra | G06Q 30/02 706/46 |
| 2015/0379112 A1 | 12/2015 | Lau et al. | |
| 2016/0042290 A1* | 2/2016 | Zhuang | G06N 7/005 706/12 |
| 2016/0378757 A1* | 12/2016 | Bahl | G06N 99/005 707/728 |
| 2017/0270484 A1* | 9/2017 | Cengiz | G06Q 10/1053 |
| 2017/0372266 A1* | 12/2017 | Shacham | G06Q 10/1053 |

* cited by examiner

*Primary Examiner* — Richard L Bowen
(74) *Attorney, Agent, or Firm* — Marin Patents LP; Gustavo Marin

(57) ABSTRACT

A system and method for inferring an organizational structure of a record based on position role transitions from a parsed plurality of record profiles using machine learning techniques described herein. A piece-wise graph of transitions between positions across a normalized user employment landscape are computed to recover properties of user hierarchical structures across a plurality of position information by analysis of transition trajectories.

18 Claims, 8 Drawing Sheets

US 10,147,020 B1

SYSTEM AND METHOD FOR COMPUTATIONAL DISAMBIGUATION AND PREDICTION OF DYNAMIC HIERARCHICAL DATA STRUCTURES

CROSS-REFERENCE TO RELATED APPLICATIONS

This application claims priority to U.S. Provisional Patent Application Ser. No. 62/538,508, filed Jul. 28, 2017, entitled "SYSTEM AND METHOD FOR COMPUTATIONAL DISAMBIGUATION AND PREDICTION OF DYNAMIC DATASETS" the entire content of which is incorporated herein by reference.

BACKGROUND OF THE INVENTION

Field of the Art

The disclosure relates to the field of computational and statistical disambiguation using machine learning, and more particularly to the field of confidence-based prediction of dynamic datasets.

Discussion of the State of the Art

Customer relationship management (CRM) is an approach to managing a company's interaction with current and potential customers. It uses data analysis about customers' history with a company and to improve business relationships with customers, specifically focusing on customer retention and ultimately driving sales growth.

One important aspect of CRM is that systems of CRM compile data from a range of different communication channels, including a company's website, telephone, email, live chat, marketing materials, and social media. Through CRM approach and the systems used to facilitate it, businesses learn more about their target audiences and how to best cater to their needs. However, CRM platforms known in the art are complicated software products whereby the accuracy of information in a CRM database is difficult to maintain with a high degree of accuracy, since it is dependent on customer interaction that may keep up with the velocity of change within an associated customer profile.

Users relying on outdated or inaccurate CRM user profiles create problems in conducting commerce and other business relationships, specifically, in a sales embodiment, an inability (or reduced capacity) to identify decisionmakers or desirable individuals with whom to do business. Problems are further magnified when a user is dealing with international profiles for international markets whereby, for example, language and position (i.e. job or role) title differences make customer profiling difficult, if not impossible, and result in creating barriers to entry. Even in countries that speak the same language (for example, the US and the UK), user profiles describing a position (that is, associated users performing the same position) may often use different titles (e.g.: lawyer and solicitor).

Specifically, problems arising from the above are: (1) missing disambiguation whereby profile designations of legal entities (companies, persons, and/or others), industries, position titles, functions, locations are not disambiguated. An entity associated to one or more user profiles may appear in many different forms and descriptions in different documents or even within a single document; (2) time dependency whereby entity names and structures can change over time. Even if processes exist to mitigate or solve problem (1) above, at a given timestamp, the data would become less and less valid again over time; (3) incompleteness whereby in systems known in the art, datasets are typically incomplete, for example, there are no complete registers comprising all legal entities worldwide, including their connections and characteristics; (4) subjectiveness, whereby the evaluation of certain characteristics of entities, for example a seniority of one position compared to another, is partially subjective; (5) Loss of Information Due to Pre-Classification whereby the lack of disambiguation (shown above) can lead to identification problems. At the same time, pre-classified data inputs reflect only a distorted image of the real world. For example, a first person may have a position titled, "Marketing Manager" in a first company, and a second person may have the same title, "Marketing Manager" in a second company. In this regard, both roles might be very different in terms of position tasks, seniority, hierarchy, etc.

What is needed is ac system and method to map common fields associated to a user profile to create a common language (e.g. legal practitioner instead of lawyer or solicitor) so that users and businesses can more accurately and more effectively identify a desired profile (e.g. target customers) across cultural and language barriers, and for dynamically changing datasets.

What is further needed is a system and method to enable and enhance identification of international user profiles and business profiles for conducting commerce (for example, for international sales prospecting).

What is further needed is a system and method to improve efficiency of sales processes to drive stronger international exports for businesses by predicting frequently changing fields of user profiles such that businesses are dealing with current and accurate CRM data. (for example, fields associated to legal entities, employee seniority, departments, functions and locations from work position data, etc.).

SUMMARY OF THE INVENTION

Accordingly, the inventor has conceived and reduced to practice, in a preferred embodiment of the invention, a system and method to disambiguate and enrich dynamic datasets to improve information about the interrelation between, at least, company profiles and individual profiles in a CRM environment (for example, a user profile comprising resume information such work history, role position and other evolving data).

According to a preferred embodiment of the invention, a unique composition of computational, statistical, and machine learning methods comprising a taxonomy of skills and profile clustering to compute broader representations within user profiles. These broader representations, termed ideal customer profiles, can then be used to find similar profiles in other countries across cultural and language barriers. Some advantages of the embodiments disclosed herein may include, without limitation, the ability to predict fields within user profiles and business profiles associated to changes in work environments, company structures, company finances, productivity, and societal wealth. Other advantages may include a more comprehensive understanding of the connections between legal entities and professional user profiles around the world.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
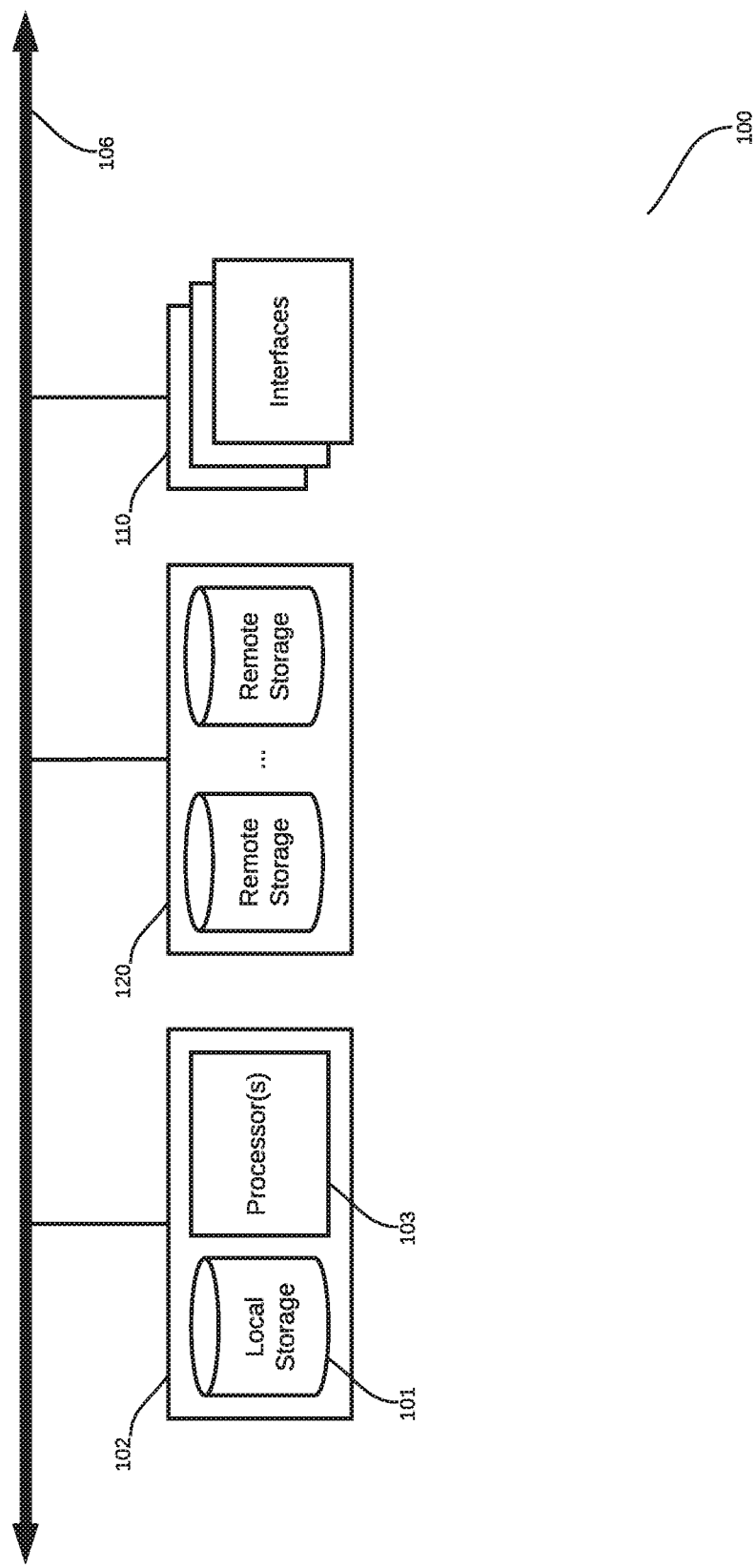
FIG. 1 is a block diagram illustrating an exemplary hardware architecture of a computing device used in an embodiment of the invention.

The inventor has conceived, and reduced to practice, a system and method to disambiguate and enrich dynamic datasets to improve information about the interrelation between, at least, company profiles and individual profiles in a CRM environment.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
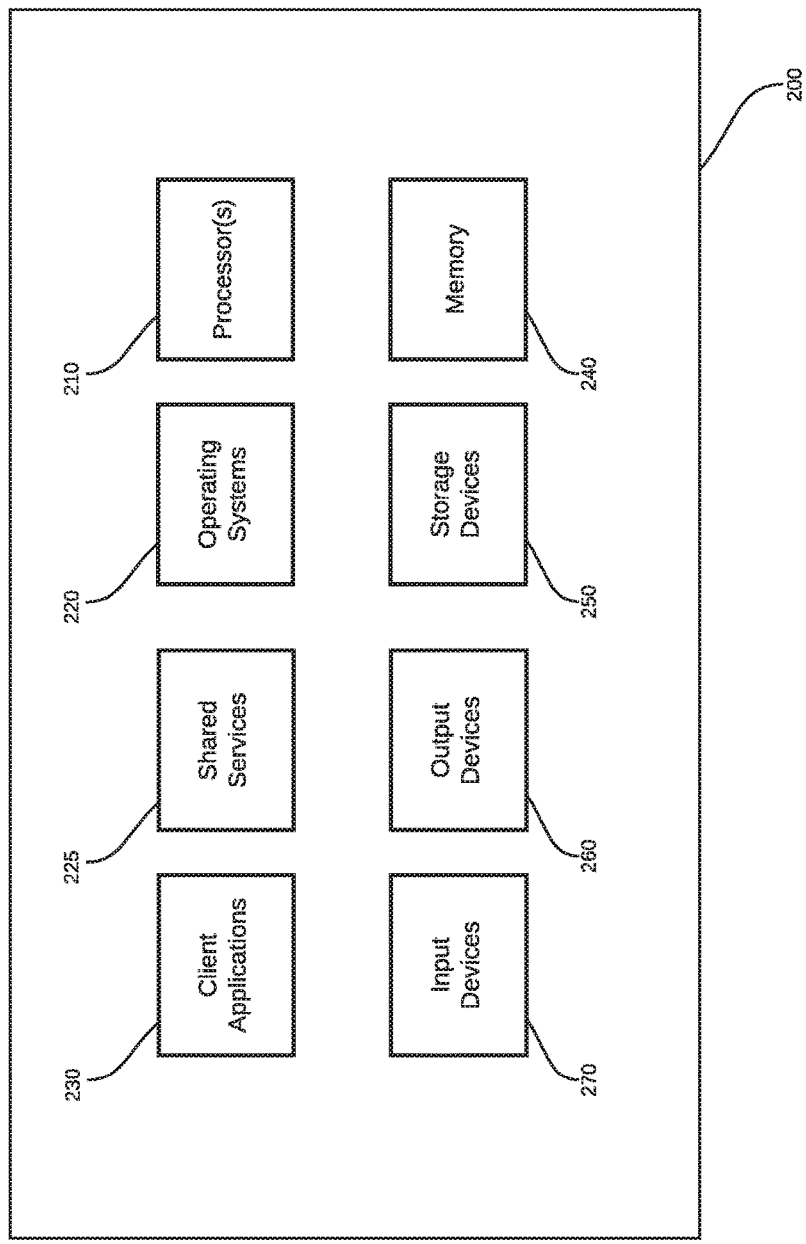
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200, and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
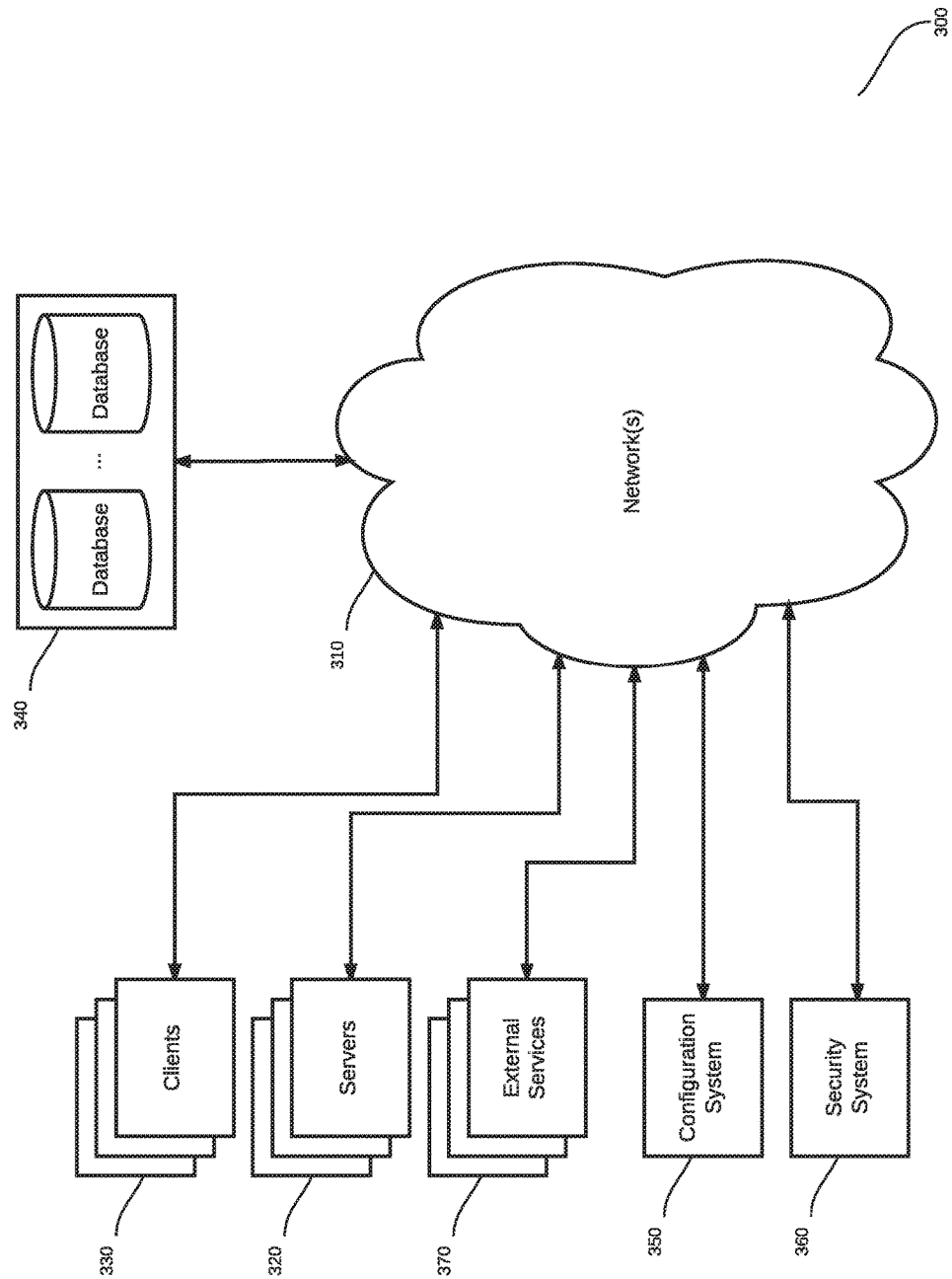
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as WiFi™, WiMAX™, LTE™, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
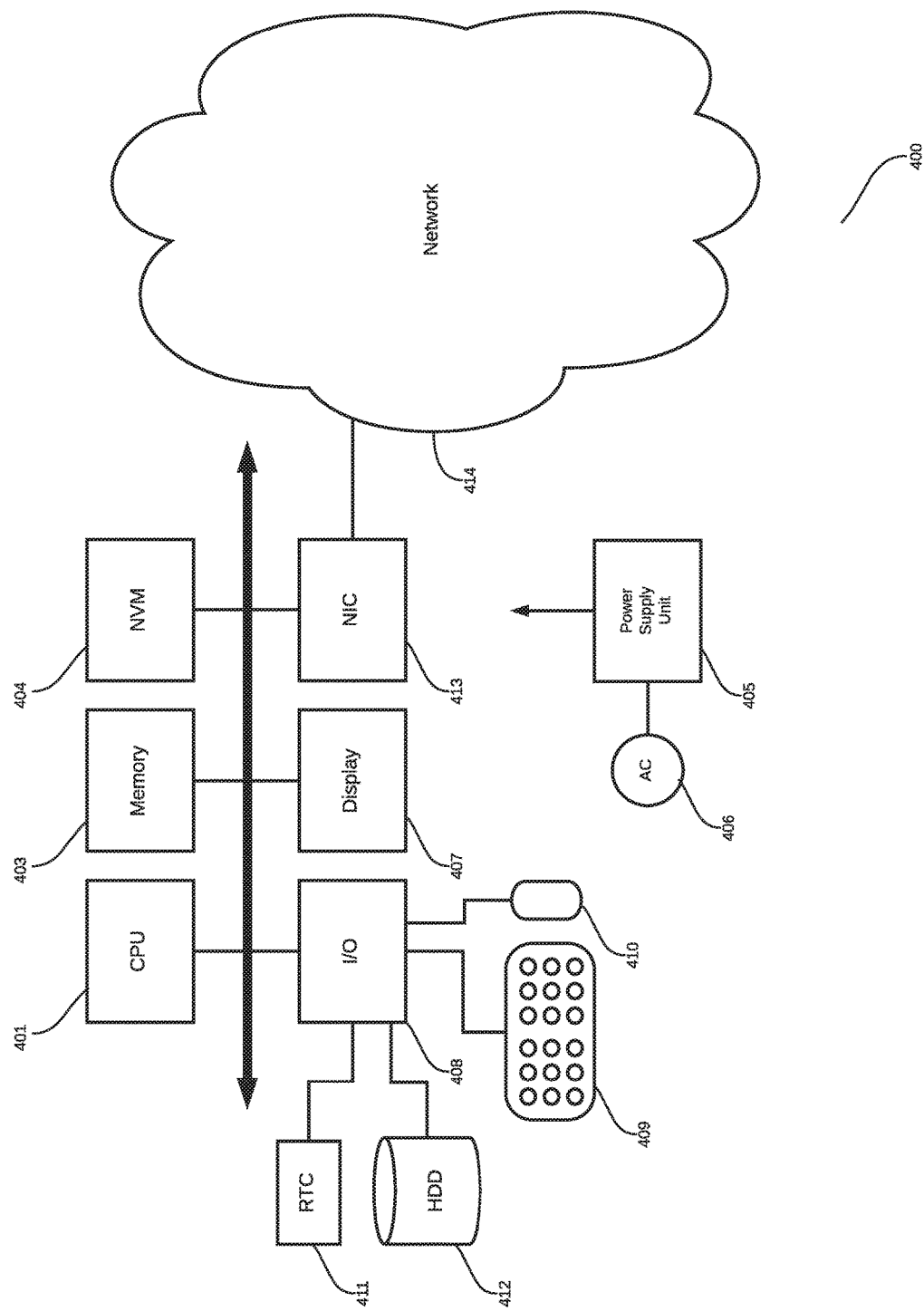
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
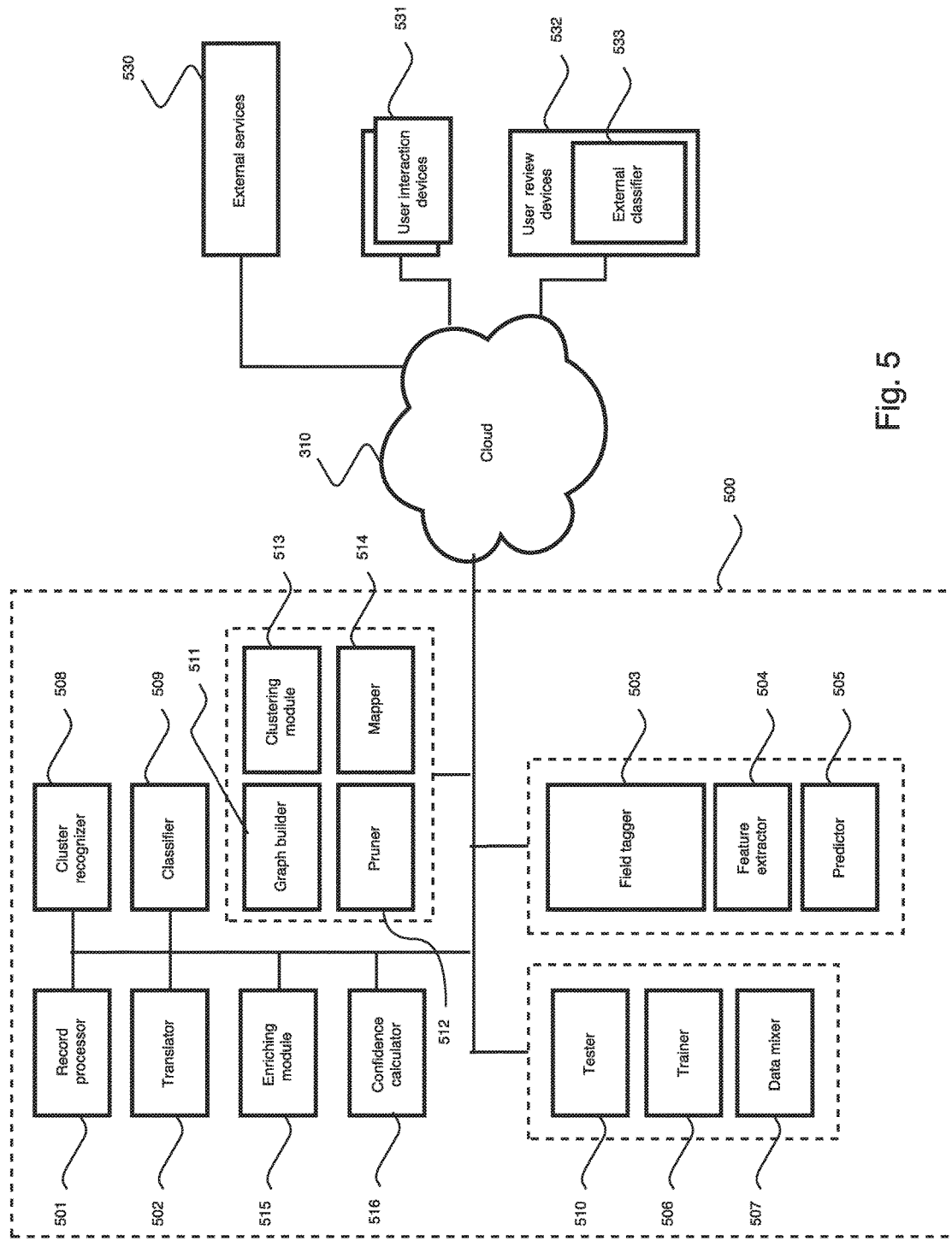
FIG. 5 is a block diagram illustrating an exemplary architecture of a disambiguation and prediction system, according to a preferred embodiment of the invention.

FIG. 5 is a block diagram illustrating an exemplary architecture of a disambiguation and prediction system, according to a preferred embodiment of the invention. According to the embodiment network-connected disambiguator 500 comprises a memory and a processor, and programming instructions stored in the memory, the programming instructions, when executed by a processor, cause the processor to perform disambiguation and prediction of dynamic datasets comprising:

Record processor 501 for receiving, parsing, and processing raw records received from external services 530 (for example, user and company profile records from a social network, online database, a CRM cloud service, or some other remote or local data source). Record processor 501 may identify a plurality of profile fields within a record and parse them into individually computable fields. Translator 502 may be operable to translate data from records into a format operable for programmatic analysis and parsing; field tagger 503 may be operable to identify a plurality of profile fields within a record, for example, in a CRM embodiment, field may comprise legal entities, position roles (hereinafter referred to as role, position, role position, or the like), and the like. Information corresponding to fields may be added by field tagger 503 (for example, as tags or metadata or some other descriptor describing at least a category of the field contents); feature extractor 504 may extract features from records including, but not limited to, existence or non-existence of certain word substrings, word shapes (for example, a series of capital letters might be a predictor for a company name), position of sub strings within sentences, documents, tables, etc.

Predictor 505 is operable to make one or more fields within a record more precise and comprehensive, for example, in a CRM embodiment, predictions about work and company environments, company hierarchies, roles, etc. Data mixer 507 is operable to format records into lists and for mixing list elements randomly. In a preferred embodiment, the remixed data, by data mixer 507, gets divided into, at least, training, cross-validation, and test data subsets; trainer 506 may function with field tagger 503 to perform prediction of data field categories, for example, a plurality of roles that may indicate a company hierarchy, the training operable to learn algorithms including weight parameters for each feature that is performed on training subsets. In some embodiments, the cross-validation subset may be used to set optimal general parameters.

It should be noted that training, by trainer 506, may provide a basis for prediction and classification. In some embodiments, trainer 506 may function in an iterative fashion whereby each iteration improves the trained result. It may be a step where data for the training subset is prepared which may include features fed into the machine learning algorithm which may include weight parameters Theta is "learned" by, for example, minimizing the cost function for the purpose of a particular prediction. In some embodiments, this is done iteratively. Accordingly, in this process, the weight parameters Theta may be "learned" in a way that the algorithm makes the ideal predictions for the training examples in the training subset. General parameters are adjusted based on results on the cross-validation subset. Afterwards the "learned" algorithms are tested for the ability to predict "unseen" examples based on the test subset.

For example, in an embodiment where there may be 100,000 elements corresponding to raw position role names where we also know a disambiguated "standard" role name (or ID), labeled data could randomly shuffled and divided into 60,000 records for the training set, 20,000 for cross-validation set and 20,000 for test set. In this regard, the prediction algorithm may be learned based on 60,000 training examples in a way that it predicts as many of the standard position roles identically to the correct results as possible. Further, parameters may be adjusted that may be responsible for the ability of the algorithm to predict standard position roles also for "unseen" raw position roles. These may be adjusted based on the results on the 20,000 cross validation examples. Results may then be tested based on the test set. The degree to which the algorithm predicts the standard position roles correctly may be then realized for the 20,000 "unseen" test examples that have not been used for training and adjustment purposes before.

In some embodiments, that this process may function in a "supervised" manner since correct answers that were used to train the algorithm may be previously known. In other embodiments, this process may leverage and unsupervised learning model where the machine language process finds common patterns without labeled reference data, for example via cluster recognizer 508 (explained below). In some embodiments, a combination of supervised and unsupervised techniques may be used together.

Cluster recognizer 508 is operable to recognize clusters within the computable data, for example, to identify useful classes or to identify useful features. In some embodiments, cluster recognizer may function in conjunction with classifier 509 (described below) for further classification, for example, to use clustering to find a very common position after a certain education step; and then to classify this cluster by predicting a certain seniority class for this position. Many clustering techniques including, but not limited to, k-means clustering, spectral clustering or co-clustering, density-based spatial clustering of applications with noise (DB-SCAN), and the like, may be used by cluster recognizer 508.

Classifier 509 may classify words into a classification schema. It should be noted that classification schemas may come from a predefined set of classes to use (for example, NAICS industry codes a custom set of industry names), or, from predominant values within clusters (for example, when in a cluster of "position roles" that comprise a predominant name, for example, "Marketing Manager", this role label may be used as a class in the classification process; or a mix of both.

In some embodiments, classifier 509 may use Conditional Random Fields (CRF) sequence classifier for identifying to which of a set of categories (sub-populations) a new observation belongs, on the basis of a training set of data, trainer by trainer 506, containing observations (or instances) whose category membership may be known. In this regard, statistical modeling methods may be applied to patterns recognized by classifier 509 within the computable data for structured prediction and sequence modeling. In some embodiments classifier 509 may take context of the computable data into account, for example, in a linear chain CRF, sequences of labels may be predicted for sequences of the records. In another embodiment, classifier 509 may employ a method of higher-order CRFs and semi-Markov CRFs whereby CRFs can be extended into higher order models by making each random variable dependent on a fixed number of previous variables. In another embodiment, latent-dynamic conditional random field (LDCRF) or discriminative probabilistic latent variable models (DPLVM) may be used as CRFs for sequence tagging by field tagger 503. It should be appreciated that classifier 509 may use one or more CRF classifiers known in the art. In other embodiments, classifier 509 may utilize basic classifier processing that may not take the sequence of classified objects into account.

Tester 510 operable to measure precision and recall of learned models described above. The precision and recall rates of learned models, as well as the probabilities of correct class attributions, are used and reused by field tagger 503 for ongoing learning of the prediction models.

Graph builder 511 may be operable to create a graphical representation of an inference of a particular field of a record (for example, in a CRM embodiment, position role transitions). In this regard, graph builder 511 may generate a factor graph comprising: connections between a first set of fields (for example a plurality of position roles) and a second set of fields (for example a plurality of position roles as variable nodes): weights as probabilities in factor nodes and connections as edges representing factorization of a probability distribution function, enabling efficient computations, such as the computation of marginal distributions through a sum-product algorithm (for performing inferences of the graphical model).

Pruner 512 is operable to prune a graph resulting from graph builder 511 to prepare for further clustering by clustering module 513. Pruner 512 is further operable to determine how significant a chain of nodes may be, for example, by determining a number of nodes, distribution of weights, an amount of supporting data points, and the like. Accordingly, pruner 512 may remove nodes, for example, nodes that are not part of a "significant" chain.

Clustering module 513 is operable to map nodes, in conjunction with node mapper 514, and node relationships directly onto the tagging classes tagged by field tagger 503 to create other, more abstract features. These features, which may be enriched and aggregated by enriching module 515 which may be operable to create richer training examples that may allow machine learning models to learn not only from features regarding single field (for example, position role), and its context within a single data records or in correspondence to another field (for example, company), but also, to learn from the complex correlations between a first set of fields (for example, position roles), a second set of fields (for example, a plurality of related companies), and a third set of fields (for example, between employees associated to the plurality of related companies, to make better predictions about position roles, their characteristics, and legal entities).

Network-connected disambiguator 500 is further operable to receive data records (for example company and user profiles) from external services 530 which may be, for example, a social network, a cloud database, a CRM service, a corporate database, or some other data source. It should be appreciated that external services 530 may reside on the same premise and be an integral part of disambiguator 500.

Network-connected disambiguator 500 is further operable to receive data records (for example company and user profiles) from one or more user interaction devices 531, for example a mobile (or stationary) user computing. Records may be received in real-time or from a database, a user interface, or memory residing on user interaction devices 531.

Network-connected disambiguator 500 is further operable to receive, via network 310, learning interactions and data from one or more user review devices 532 (for example, a mobile or stationary network-connected computing device) in a "supervised" machine learning scenario. It should be appreciated that user review devices 532 may be operable to receive input form a user via a touch screen, keyboard, voice, or some other input mechanism. User review devices 532 may comprise external classifier 533 which may function in a similar fashion as classifier 509, or via interaction with a user associated to user review devices 532.

DETAILED DESCRIPTION OF EXEMPLARY EMBODIMENTS

Figure 6:
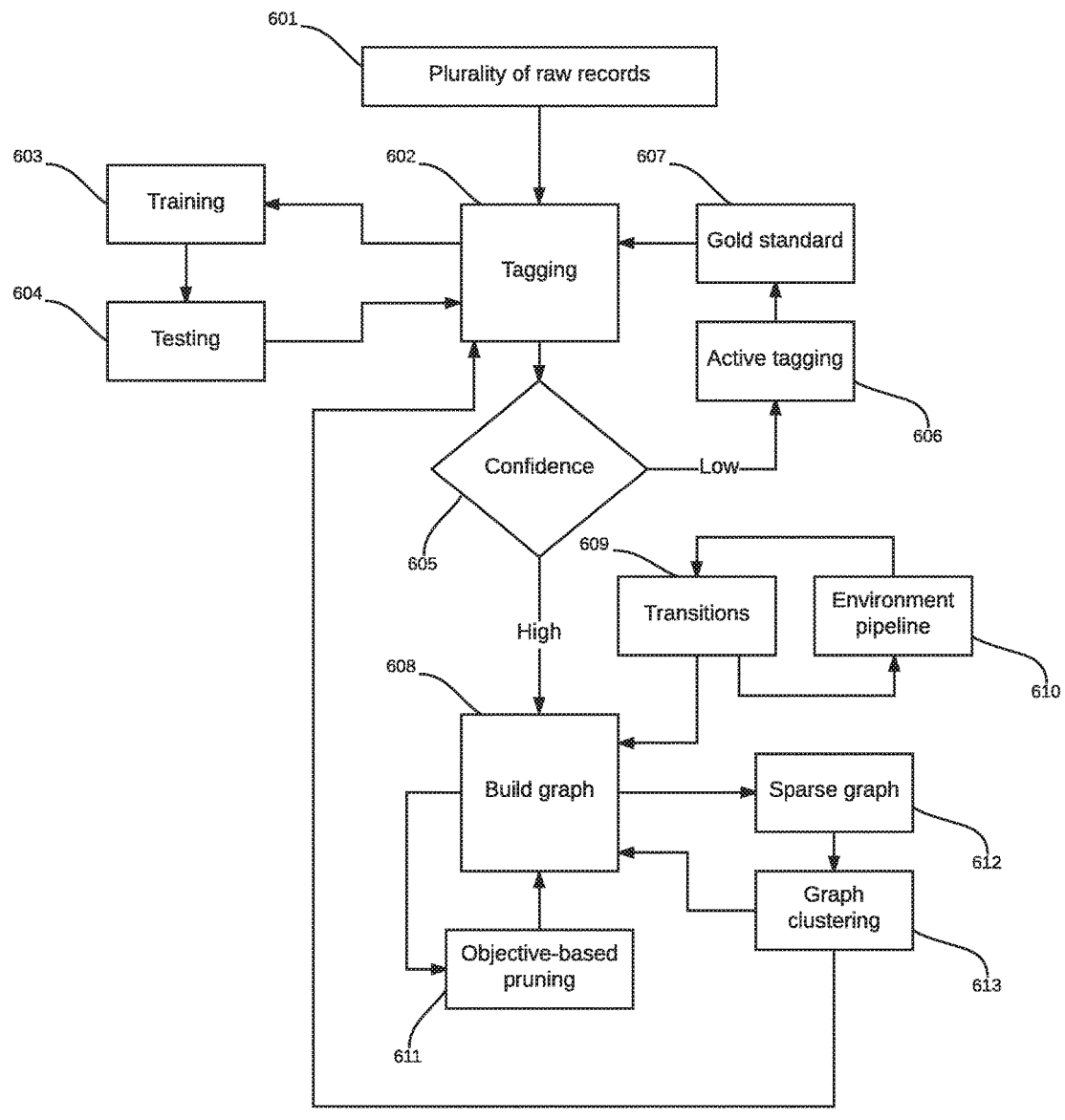
FIG. 6 is a flow diagram illustrating an exemplary method for disambiguation in a CRM environment, according to a preferred embodiment of the invention.

FIG. 6 is a flow diagram illustrating an exemplary method for disambiguation in a CRM environment, according to a preferred embodiment of the invention. According to the embodiment, in a first step 601, record processor 501 receives a plurality of raw data records from a database (for example database 412), a plurality of external services 530 and/or user interaction devices 531 via network 310. Raw data records may comprise a plurality of user profiles associated to a juristic entity or an organization, and the like. Raw data records may be translated into a structured format, by translator 502, able to be a computed (for example, .csv files, database tables, database documents, and/or the like) such that translator 502 and field tagger 503 may delineate a plurality of sentences or other strings of words within the raw data into its associated constituents (or fields), resulting in an arrangement showing their syntactic relation to each other, which may also contain semantic and/or other information.

In a next step 602, a first data record may be classified, by classifier 509, and tagged, by field tagger 503, to identify a plurality of profile fields, for example, possible legal entities, position roles, contact information, and the like. Field information may be added (for example, as tags or metadata) to the first file record and a plurality of features may be extracted, by feature extractor 504, that may be relevant for predictions by predictor 505 via machine learning. Features may include, but not limited to, existence or non-existence of certain word substrings, word shapes (for example, a series of capital letters might be a predictor for a company name), position of substrings within sentences, documents, tables, etc.

In some embodiments, classifier 509 may use Conditional Random Fields (CRF) sequence classifier for classification. In this regard, statistical modeling methods may be applied to patterns recognized by classifier 509 within a data record for structured prediction and sequence modeling. In some embodiments classifier 509 may take context of a data record into account, for example, in a linear chain CRF, sequences of labels may be predicted for sequences of a data record. In another embodiment, classifier 509 may employ a method of higher-order CRFs and semi-Markov CRFs whereby CRFs can be extended into higher order models by making each random variable dependent on a fixed number of previous variables. In another embodiment, latent-dynamic conditional random field (LDCRF) or discriminative probabilistic latent variable models (DPLVM) may be used as CRFs for sequence tagging by field tagger 503. It should be appreciated by one with ordinary skill in the art that classifier 509 may use one or more CRF classifiers known in the art. In some embodiments, classifier 509 may utilize basic classifier processing that may not take the sequence of classified objects into account.

In a next step 603, prior to training by trainer 506, the computable data may be formatted into lists and randomly mixed by data mixer 507. The mixed data may get divided into, at least, training, cross-validation, and test data subsets. The training subset may be used to learn the algorithms including weight parameters theta for each feature is performed only on the training subsets, as described above. The cross-validation subset may be used to set optimal general parameters; that is, parameters with which the algorithm may make a "best prediction" based on the cross-validation set may be optimal in some embodiments. It should be noted that common measures for the performance of the algorithm are precision and recall. For example, an F-Score as is known in the art. In this regard, the measure may be a mean or some kind of weighing of precision and recall.

In some embodiments, a separate cross validation subset may be optional. In some embodiments, data sets may be separated differently (for example, by using the test set also to adjust parameters).

In some embodiments, unsupervised machine learning methods may be used, by cluster recognizer 508 to recognize clusters within the computable data, for example, to identify useful classes or to identify useful features.

In some embodiments, in step 605, confidence calculator 516 may use previous processed profiles and edges between nodes created within a transition graph to determine a level of confidence for the instant transition. Where a confidence is considered low (that is, the confidence is below a pre-configured threshold, supervised machine learning methods may be used, in step 606, by receiving active tagging input from user review devices 532, to map information onto classes while storing the related probabilities. That is, a certain element belongs to particular class. Accordingly, the element may be classified to a class with the highest probability In a next step 604, computable data is tested, by tester 510, to measure precision and recall of the learned models (for example, a company is a "publicly" traded company may be classified as positive to a, for example, class "is_public"). In some embodiments, precision may measure to what degree examples that were classified as, "public" are actually, "public". For example:

$$\text{Percision} = \frac{\text{True Positives}}{(\text{True Positives} + \text{FALSE POSITIVES})}$$

Recall may measure, to which degree companies classified as public have been classified. Said differently, to which degree the process has "found" all public companies. For example:

$$\text{Recall} = \frac{\text{True Positives}}{(\text{True Positives} + \text{FALSE POSITIVES})}$$

The precision and recall rates of the learned models as well as the probabilities of correct class attributions flow back into step 602 for ongoing learning of the prediction models by field tagger 503. In this regard, referring again to step 602, if, for example, a specific record (that is, from step 601) that may be classified, by classifier 509, with low certainty, in some embodiments, the record may be delivered to a plurality of user review devices 532, via network 310 for further review and classification processing by external classifier 533. In some embodiments, if one or more records are classified, by classifier 509, with high certainty, the one or more records may be randomly selected to be delivered to the plurality of user review devices 532, via network 310 for further review and classification processing by external classifier 533 to cross-check results.

Remaining records designated with high certainty may then processes in a next step 608. Accordingly, records (for example, in a normalization of CRM data) may now comprise structured and disambiguated information as follows in Table 1:

TABLE 1

Person Name and Unique Identifier
Time Period
Position
Function
Seniority
Company or other legal entity
Legal entity type (for example: private company, public company, specific kind of government institution, person (self-employed), and the like)
Department
Location
Industry It should be appreciated that exact nomenclature, structure and extent of the table above may deviate for different embodiments of the invention or for different data sets inputted in step 601.

Further in step 608, graph builder 511 may create a graphical representation of the inference of a particular field of a record (for example, position role transitions). In this regard, graph builder 511 may generate a factor graph to provide connections between a first set of fields (for example a plurality of position roles as nodes) and a second set of fields (for example a plurality of position roles as variable nodes), weights as probabilities in factor nodes, and connections as edges representing factorization of a probability distribution function, enabling efficient computations, such as the computation of marginal distributions through a sum-product algorithm (for performing an inference of the graphical model). According to the embodiment, classification may be performed as a hierarchical prediction problem, for example, a graph by graph builder 511, may begin by identifying a hierarchy for an organization, or a hierarchy for an individual based on data associated to a computed starting point and progressing onwards. For example, in the case of raw data corresponding to an individual, identifying an individual's first position as a professional and instantiating the first position within the graph, then, by adding edges to the graph corresponding to subsequent positions. For example, an individual's first position is an "analyst" at a first financial institution, a second position as an associate at the first financial institution, then a third position as a "vice president" at a second financial institution whereby transitions are detected in step 609. Accordingly, an edge between an "associate" at the first financial institution and a "vice president" at the second financial institution may be created within the graph by graph builder 511. The process continues for all profiles from the raw data in the dataset received in step 601, for example, all profiles from a social network, for example LinkedIn™, Facebook™, and the like. It should be appreciated that edges may be weighted by graph builder 511 to give more "weight" or influence on the result than other elements in the same set.

It should be appreciated by those with ordinary skill in the art, that when processing a large amount of records by graph builder 511, a noisy graph comprising nodes where inaccurate or "garbage" data may result, whereby edges may represent role data (i.e. professional position) associated low unique occurrences (that a low number of a certain type of transition across the entire data set, for example, a "lobster fisherman" transitioned to a "president of a high-tech company"). Accordingly, an objective of pruner 512, in step 611, is to optionally prune the graph (from step 608) to prepare for further clustering. Within the pruning process a plurality of nodes may be removed, for example, nodes that are not part of a significant chain. Significance of a chain will be defined and quantified by pruner 512 for example, by at least, determining a number of nodes, distribution of weights, and amount of supporting data points "de-nosifying" the graph, that is, to identify meaningful edges within the graph that are representative to common occurrences (for example, role transitions) within companies, while removing edges that are considered meaningless within an associated context. Using an iterative process, comprising of an understood hierarchy, graph builder 511 may identify when two constituents, that may be worded differently, represent a similar semantic meaning. For example, two roles within one or more companies are representing the same function (or role) whilst using different names; consequently, graph builder 511 may merge the two roles together into a representative role. Pruner 512 may further identify gaps with missing information and predict, by predictor 505, a suitable value. As each iteration continues, a representative graph evolves whereby future profiles are compared to the representative graph and fields within those profiles may be normalized.

In some embodiments, a pruning process by pruner 512 may allow visualization and may minimize computational costs.

Accordingly, the pruning of step 611 may allow graph builder 511 to output a sparser graph, in step 612, to minimize the total number of edges while maintaining all significant nodes and edges, thus making the graph more representative (that is, a representative graph with a high confidence of representation) with each iteration.

In a next step 613, nodes of the pruned graph are clustered, by clustering module 513, to allow mapping of nodes and node relationships, by node mapper 514, directly onto the tagging classes of step 602, or to create other, more abstract features for representation (that is, an individual measurable property). These features, which may be enriched and aggregated by enriching module 515 to create optimized training examples that may allow the machine learning models to learn not only from features regarding single field (for example, position role), and its context within a single data records or in correspondence to another field (for example, company); but also, to learn from the complex correlations between a first set of fields (for example, position roles), a second set of fields (for example, a plurality of related companies), and a third set of fields (for example, between employees associated to the plurality of related companies), to make better predictions about position roles, their characteristics, legal entities, and more.

Accordingly, a hierarchy representative of structures present in companies where clean role data is presented and understandable, whereby edges in the nodes are learned at each iteration. For example, one node might be an analyst, another node might be an associate, etc. (and patterns may emerge identifying profiles indicating a predictable progression between a plurality of roles within a user profile in the universe of data)

Once a hierarchy is established, through each iteration, from training step 603 and testing step 604, a progressively more accurate structure of associated entities (for example, companies) emerges.

The iterative process of method 600 continues at step 601 until certain pre-defined equilibrium criteria is met. In some embodiments, as each iteration continues, parameters of the model for building the graph are not changing more than a certain epsilon within every iteration. Accordingly, it may be understood that the representative graph conforms to a level of expectation about representation that the graph may be to the underlying universe of data for a specific embodiment; for example, a graph of normalized roles in a CRM environment representative with a high level of expectation of accuracy for those normalized roles.

Referring again to the embodiment of normalization in a CRM environment, once enough iterations have been processed (that is, where there may have been a large number of individual profiles of a particular company and roles are identified within method 600), data (for example, roles) are comparable across entities, for example, be representing: a same amount of experience, same demographic balance, same connection other roles, and the like, the representative graph corresponding to an internal structure of companies may be realized.

Figure 7:
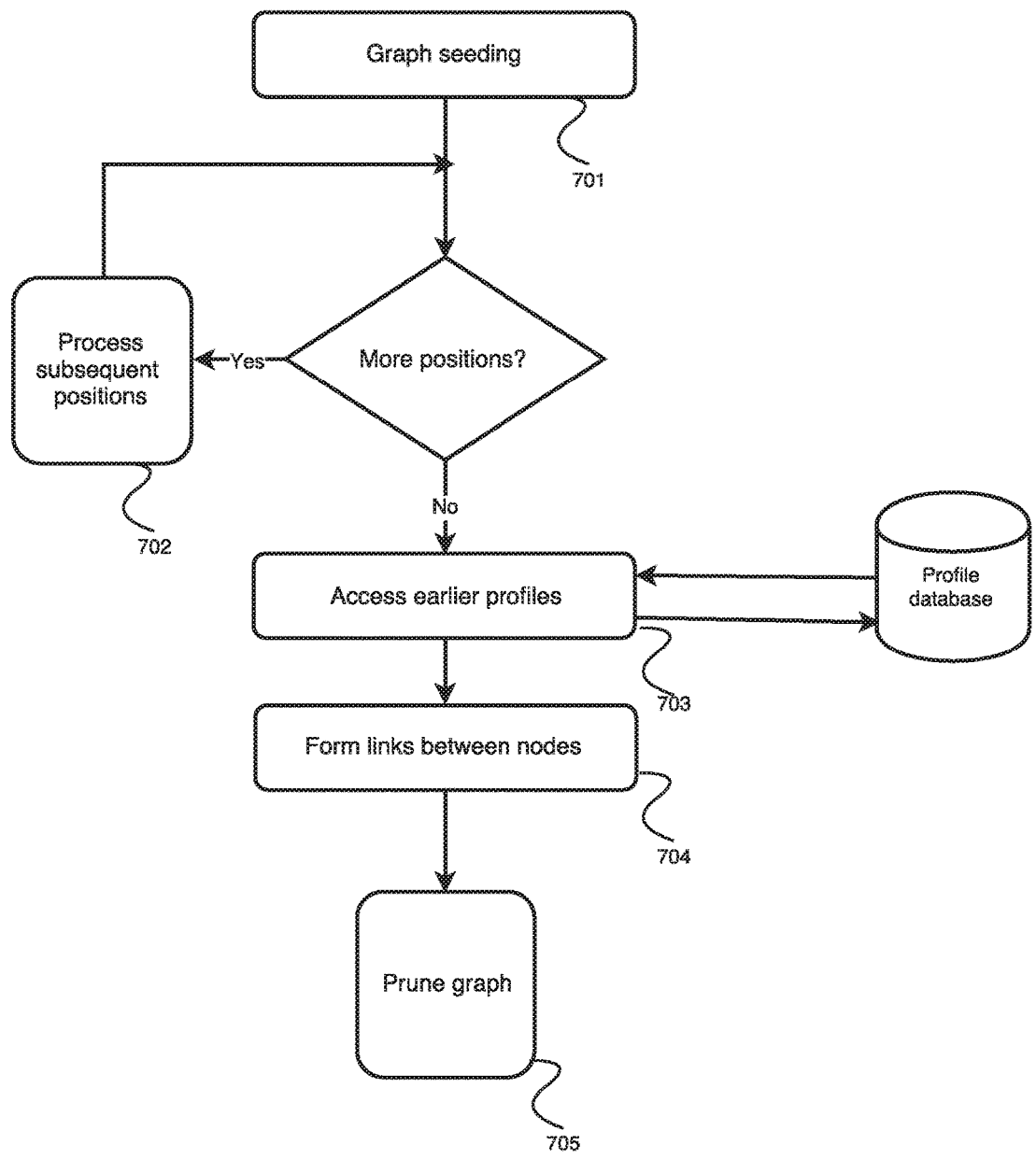
FIG. 7 is a flow diagram for constructing an employment transition graph and identifying hierarchical levels within organizations.

FIG. 7 is a flow diagram for constructing an employment transition graph and identifying hierarchical levels within organizations, according to a preferred embodiment of the invention. According to the embodiment, graph builder 511 comprises a methodology for building an employment transition graph and calibrates pruning parameters described herein.

Accordingly, a plurality of characteristics for each individual profile is considered, for example: city and country level location, an approximate age, education and employment history (organization, role/degree, start date, end date), size of the individual's professional network, a set of skills volunteered by the individual, and the like. An exemplary record may be as follows:

{
  "full name": "Estevam Souza",
  "birthdate": 599616000,
  "city": "Sao Jose da Lapa",
  "country": "Brazil",
  "education": [
    {
      "company": "INJECAO ELETRONICA",
      "from": "2015",
      "name": "ESCOLA DE MECANICA REAL MASTER",
      "to": "2015"
    }
  ],
  "experience": [
    {
      "company": "Caterpillar",
      "from": "November 2013",
      "name": "Analista de Compras Nacionais"
    }
  ],
  "skills": [
    "Microsoft Office",
    "Melhoria continua"
  ],
  "summary": [
    "current": "Caterpillar",
    "description": "Analista de Compras Nacionais na Caterpillar",
    "industry": "Business Supplies and Equipment"
  ]
}

The key data field for the analysis consists of the roles within the profile within each organization of employment. A position name field from each employment record in each profile is extracted—for example, the position "Analista de Compras Nacionais" in the sample profile above. In a preferred embodiment, these role names are normalized for case and punctuation, but otherwise, may be left in free form to allow for a richness of possible roles within the sample.

Further according to the embodiment, profile positions may be associated to profile education indicators: while the first employment position immediately following a high school or college degree is likely to represent an entry-level position, higher-level education such as doctoral degrees tends to come chronologically later for a particular profile. In order to leverage the rich education data in constructing a role hierarchy, educational records may be used to identify, for example, the types of degrees associated to the profile, as well as whether a top academic institution is associated to a profile. The degree types of interest may be, for example: high school, vocational associates, bachelors, masters (other than an MBA), MBA, doctoral (including Ph.D., M.D., and J.D. degrees), and the like. In some embodiments, "elite" class institutions may be identified by accessing external service 530 (for example, US News and World Report National Universities Ranking™ and the Times Higher Education World University Rankings™, or a combination of both, or other like service) to determine a class for institutions. A profile identifying at least one degree from one of these institutions may be labeled as having an associated education to an elite class institution.

Since employer names in profiles are mostly entered free-form, for example by human users, the raw data may contain a number of inconsistencies, alternative references, and misspellings. For example, employees of Banana Republic™, the apparel brand, may refer to their employer as "Banana Republic™," when in fact they are employees of "The GAP™ Inc.," and Banana Republic™ is one of several brands in the firm's portfolio. In addition, abbreviations ("GE™", "IBM™"), missing suffixes ("Inc.", "Corp."), and a variety of other inconsistencies may complicate the problem of reliably linking profiles to companies. To disambiguate a plurality of listed employer names to company entities, graph builder 511 may construct a canonical list of semantic entities from specific external services 530 (for example, the WikiData™ project, Vrandečič and Krötzsch 2014) and the Google™ Knowledge Graph Search API (Singhal 2012).

Accordingly, construction of an employment transition graph may begin in a first step 701, an employment transition graph is seeded, by graph builder 511, with a first profiles' first post-education position. In order to seed the graph, graph builder 511 finds the first post-education position within the first profile. In particular, for each profile, graph builder 511 may identify a contiguous sequence of education and check that the highest degree that the individual obtains is not a doctoral degree. In some embodiments, graph builder 511 may exclude doctoral degrees (J.D.'s, M.D.'s, and Ph.D.'s) in the seeding phase since after obtaining these degrees, individuals are unlikely to enter employment at an entry level. graph builder may identify a first position at the end of a contiguous education sequence and insert it as an entry-level position into the employment transition graph.

In a next step 702, subsequent profile positions are sequentially inserted as nodes into the employment transition graph based on transitions (for example, transitions from position to position associated to positions in the first profile). For example, a position j that begins later than an immediate post-education position within the profile.

In a next step 703, earlier processed profiles in the sample are accessed and reviewed to identify any other profiles working at the same position j, if so, graph builder 511 may take this existing node; otherwise, graph builder 511 may add a new node into the graph.

Figure 8:
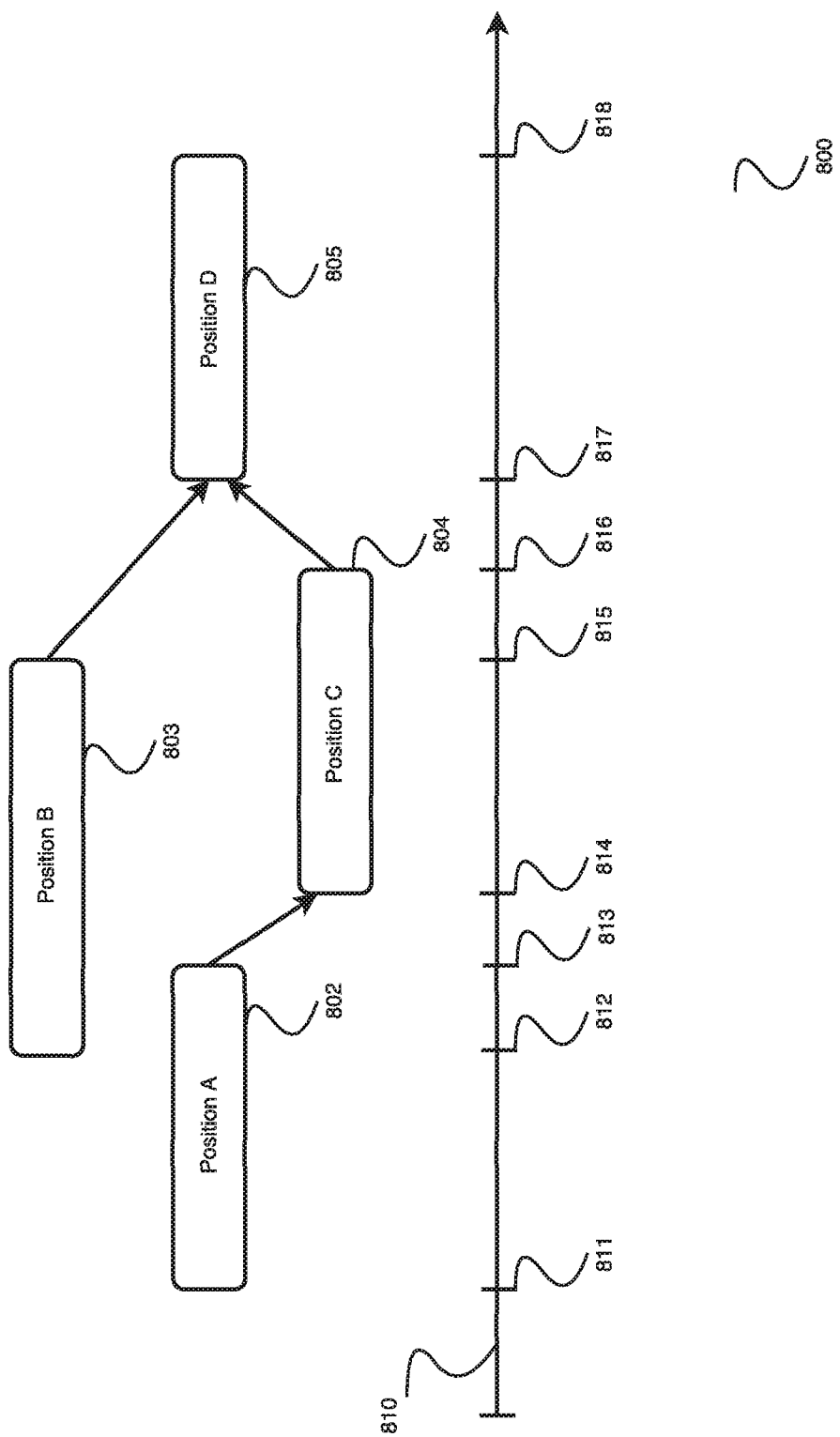
FIG. 8 is a block diagram illustrating an exemplary insertion process, according to an embodiment of the invention.

In a next step 704, graph builder 511 may then form links between the node representing position j and all existing nodes i representing the first profile's prior positions that satisfy, for example, the following conditions: (1) the profile's end date for position i is the same or before the profile's start date at position j; and, (2) the profile indicates no other positions that began after an end date for i and before the start date for j. If positions i and j satisfy these conditions, then we add a new directed edge from i to j (if such an edge does not already exist) or increase the strength of the edge by one (if such an edge already exists). An exemplary inserting process is illustrated in FIG. 8.

In some embodiments, nodes representing positions in the employment transition graph may be labeled with strings consisting with an associated position role name. Graph builder 511 may also keep, for example, the following additional attributes: the in-degree and out-degree of the node, as well as the total number of profiles that include a particular position at least once, an average age associated to an individual represented by a profile, duration at a position, a gender identifier, skill breakdown, and other profile information. A plurality of profiles may be used in pruning the graph by pruner 512, while the characteristics associated to each profile such as gender and skills enable a plurality of business applications (for example, providing insight into employment dynamics, workforce imbalances, and firm evolution over time). Graph builder 511 may also store a list of company names for which an associated profile comprising this position may have been employed at the time of the position, in order to retain the ability to reconstruct a hierarchical graph for individual companies.

In some embodiments, feature extractor 504 may extract additional features from the results of the graph building process by graph builder 511. For example, the probability to which a first given position role follows on another given position role among all represented career paths within the graph, wherein a career path is a series of employment transitions that may represent a typical career that a profile may follow. This extraction of additional features may make information within the graph available for the training process 603 of the classification process by classifier 509 which, as outlined previously, disambiguates the information in a continuous improvement process.

For profiles comprising education identifiers that includes a doctoral degree, the process of inserting or updating nodes is analogous to the non-first positions of the individuals without doctoral degrees. Graph builder 511 may begin with the first position listed on a doctoral profile. If a node representing this position exists in the graph, then graph builder 511 may update the node's demographics; if no node exists representing the position, then such a node is inserted into the graph. In both cases, no new edges are added into the node, as it is not preceded by any other position in the doctoral profile. The remaining positions in the doctoral profile may be processed as described previously.

In a next step 705, the employment transition graph is pruned, by pruner 512, to remove the most uncommon nodes representing noise (for example, from syntactic/semantic inconsistencies, formatting issues, and incorrect field usage). Accordingly, since employment profiles represent unconstrained user input from a variety of sources, even with the company name disambiguation and role normalization procedures, the number of unique positions within profiles may be of a large magnitude (for example, two million). Many of the nodes may be only listed in one or two profiles, indicating either esoteric positions that are not representative of the data, or products of users' manual entry errors, or some other anomaly. In order to diminish the impact of these esoteric or mistaken position entries, pruner 512 may prune the employment transition graph, removing the most uncommon nodes.

The pruning parameter, p, may be the minimum number of profiles that comprise a given position that may be required for the node to remain in the graph. The pruning process, by pruner 512, may balance a two-fold objective. On the one hand, pruner 512 may wish to remove noise in order to arrive at the most robust representation of the true employment landscape. On the other hand, pruner 512 may wish to retain the maximum number of real positions in order to keep the graph as comprehensive as possible.

We address this two-fold problem using k-fold cross-validation, building the graph on the subset of the data (D∈ $\mathcal{P}$, where $\mathcal{P}$ represents the entire employment dataset), applying a pruning parameter p, and calculating the log likelihood of observing the remaining slice of the data $\mathcal{P}$/D. The pruning parameter p is then chosen to maximize the log likelihood function.

To formalize the evaluation problem, pruner 512 may begin by introducing notation. Let $G_{D,p}$ denote the graph built from the subset of the data D with a pruning parameter p. Let $\mathcal{V}(G_{D,p})$ and $\mathcal{E}(G_{D,p})$ denote the set of vertices and the set of edges of $G_{D,p}$, respectively. For any $n_i$, $n_j \in \mathcal{V}(G_{D,p})$, let $\varepsilon(n_i; n_j) \in \mathcal{E}(G_{D,p})$ denote a directed edge from $n_i$ to $n_j$, and let $|\varepsilon(n_i; n_j)|$ denote the strength of this edge. Let $|n_i|$ denote the total number of individual who list $n_i$ at least once on their profiles.

Let d∈ $\mathcal{P}$/D be an arbitrary employment profile in the test set, represented as a sequence of k(d) position nodes: $d=(n_1^d, \ldots, n_{k(d)}^d)$, for $n_1^d, \ldots, n_{k(d)}^d \in \mathcal{V}(G_{D,p})$. In the sequence of nodes representing d, pruner 512 may ignore any position that does not appear in the constructed graph $G_{D,p}$. Then the likelihood of observing the training set of profiles $\mathcal{P}$/D may be given by:

$$\mathcal{L}(\mathcal{D}\backslash D \mid G_{D,p}) = \prod_{d \in \mathcal{D}\backslash D} \left( \frac{|n_1^d|}{\sum_{n_i \in \mathcal{V}^s(G_{D,p})} |n_i|} \times \prod_{m=1}^{k(d)-1} \left( \frac{|e(n_m^d, n_{m+1}^d)|}{\sum_{n_i \in \mathcal{V}(G_{D,p})} |e(n_m^d, n_i)|} \right) \right), \quad (4)$$

where $\mathcal{V}^s(G_{D,p})$ denotes the set of seed nodes representing entry-level positions.

Thus, pruner 512 may choose the pruning parameter p to solve the following optimization problem:

$$p = \underset{p'}{\operatorname{argmin}} \sum_{m=1}^{k} \log \mathcal{L}(\mathcal{D} \setminus D_m | G_{D_m, p'}),$$

where the full sample $\mathcal{D}$ is partitioned into k subsamples $D_1, \ldots, D_k$ for the k-fold cross-validation.

In a preferred embodiment, a preferred result of the cross-validation procedure for a variety of pruning parameters are displayed in FIG. 9.

FIG. 8 is a block diagram illustrating an exemplary insertion process, according to an embodiment of the invention. According to the embodiment, chronological time scale 810 shows a beginning and end date for positions with an exemplary profile with date markers 811-818, each date marker 811-818 denoting a start and end date for each position (for example, position 803 has a start date 812 and an end date 815). The first post-education position for a first exemplary profile may be position 802 "position A" with a start date 811, seeded as an entry-level position and linked to the individual's education profile. The next position 803 "position B" on the individual's employment profile, listed in order of start dates (i.e. start date 812). Since start date 812 (corresponding to position 803) begins before end date 813 (that is, the end date for position 802) ends, then no edge is drawn between position 802 and position 803. The profile's next, according to time scale 810, position 804 "position C" with start date 814 and end date 816. Since start date 814 is after end time 813, position 804 begins after 802 ends, and since a representative transition graph for the first profile has had no directed edges leaving 802 yet, a directed edge is drawn from 802 to 804. A last position 805 on the first profile, in order of start dates, is "position D". Position 805 may begin after the end dates of all three of the preceding positions, 802, 803, and 804. However, since A has already been connected to 804, 805 receives incoming edges only from positions 803 and 804.

The skilled person will be aware of a range of possible modifications of the various embodiments described above. Accordingly, the present invention is defined by the claims and their equivalents.

What is claimed is:

1. A dataset disambiguation system comprising:
  a network-connected disambiguation server comprising a memory and a processor and further comprising programmable instructions stored in the memory and operating on the processor, the instructions when executed by the processor, cause the processor to:
  parse each record, of a plurality of records, into a plurality of fields;
  tag each field of the plurality of fields, the tags describing the fields as normalized descriptors;
  classify each field of the plurality of fields based on a predefined classification schema;
  create a prediction model by predicting a normalized value for each field of the plurality of fields, the normalized values based on the predefined classification schema;
  iteratively update at least a portion of normalized values of the predefined classification schema;
  measure a precision of the normalized values for each field of the plurality of fields based on a degree to which normalized values have been properly recalled;
  iteratively feed back the precision into the prediction model for ongoing learning of the prediction model;
  generate a factor graph comprising:
    a first plurality of nodes;
    a second plurality of nodes;
    a plurality of weights as probabilities;
    a plurality of connections as edges representing factorization of a probability distribution function;
    provide the plurality of connections between the first set of nodes and the second set of nodes;
  identify a first node of the first plurality of nodes corresponding to a first position role associated to a first record of the plurality of records;
  instantiate the first position role within the factor graph;
  iteratively add edges to the factor graph corresponding to subsequent position roles;
  detect transitions for the plurality of position roles associated to the first record;
  wherein the predefined classification schema is a predefined set of classes or from predominant values within the factor graph;
  wherein the first plurality of nodes corresponds to a first plurality of position roles and the second plurality nodes corresponds to a plurality of position roles as variable nodes.

2. The system of claim 1,
  wherein the instructions when executed by the processor, further cause the processor to calculate a confidence level for each classified field.

3. The system of claim 2, wherein the instructions when executed by the processor, further cause the processor to receive a plurality of connections from a plurality of network-connected user devices;
  wherein if the confidence level is below a preconfigured threshold, a request for classification is sent to at least a portion of the plurality of network-connected user devices.

4. The system of claim 1,
  wherein the instructions when executed by the processor, further cause the processor to extract one or more predefined word substrings, one or more predefined word shapes, or one or more positions of predefined substrings from a plurality of fields associated to a plurality of career paths within at least one hierarchy associated to an organization identified by the graph builder.

5. The system of claim 1, wherein the instructions when executed by the processor, further cause the processor to weight the edges.

6. The system of claim 5,
  wherein the instructions when executed by the processor, further cause the processor to prune the factor graph to remove nodes that are not a predefined level of significance.

7. The system of claim 6, wherein the level of significance determines, at least, a number of nodes, or distribution of weights, or both, to identify edges that are representative of common role transitions.

8. The system of claim 1, wherein precision is computed by the number of normalized descriptors that were determined to be true positives divided by the sum of the true positives and the false positives.

9. The system of claim 1, wherein proper recall is computed by the number of normalized descriptors that were determined to be true positives divided by the sum of the true positives and the false negatives.

10. A dataset disambiguation method comprising the steps of:
  parsing, by a server, a plurality of records into a plurality of fields;
  tagging, by the server, each field of the plurality of fields, the tags describing the fields as a normalized descriptor;
  classifying, by the server, each field of the plurality of fields based on a predefined classification schema;
  creating, by the server, a prediction model by predicting a normalized value for each field of the plurality of fields, the normalized values based on the predefined classification schema;
  iteratively updating, by the server, at least a portion of normalized values of the predefined classification schema;
  measuring, by the server, a precision of the normalized values for each field of the plurality of fields based on a degree to which normalized values have been properly recalled;
  iteratively feeding, by the server, the precision back into the prediction model for ongoing learning of the prediction model;
  generating, by the server, a factor graph comprising:
    a first plurality of nodes;
    a second plurality of nodes;
    a plurality of weights as probabilities;
    a plurality of connections as edges representing factorization of a probability distribution function;
  identifying, by the server, a first node of the first plurality of nodes corresponding to a first position role associated to a first record of the plurality of records;
  instantiating, by the server, the first position role within the factor graph;
  iteratively adding, by the server, edges to the factor graph corresponding to subsequent position roles;
  detecting, by the server, transitions for a plurality of position roles associated to the first record;
  wherein the predefined classification schema is a predefined set of classes or from predominant values within the factor graph;
  wherein the first plurality of nodes corresponds to a first set of positions of the plurality of position roles and the second plurality of nodes corresponds to a second set of positions of the plurality of position roles as variable nodes.

11. The method of claim 10, further comprising the step of calculating, by the server, a confidence level for each classified field of the classification schema.

12. The method of claim 11, further comprising the step of;
  receiving, at the server, a plurality of connections from a plurality of network-connected user devices;
  if the confidence level is below a preconfigured threshold, requesting, to at least a portion of the plurality of network-connected user devices, a classification.

13. The method of claim 10 further comprising the step of:
  extracting, by the server, one or more predefined word substrings, one or more predefined word shapes, or one or more positions of predefined substrings from a plurality of fields associated to a plurality of career paths within at least one hierarchy associated to an organization identified by the graph builder.

14. The method of claim 10, further comprising the steps of, weighting, by the server, the edges.

15. The method of claim 14, further comprising the step of pruning, by the server, the factor graph by removing nodes that are not a predefined level of significance.

16. The method of claim 15, further comprising the steps of defining, by the server, the level of significance by, at least, determining a number of nodes, or distribution of weights, or both, to identify edges that are representative of common transitions.

17. The method of claim 10, wherein precision is computed by the number of normalized descriptors that were determined to be true positives divided by the sum of the true positives and the false positives.

18. The method of claim 10, wherein proper recall is computed by the number of normalized descriptors that were determined to be true positives divided by the sum of the true positives and the false negatives.

* * * * *